April 6, 1926.  W. T. BROWN  1,579,277
LAND CULTIVATING MACHINE
Filed March 3, 1923   3 Sheets-Sheet 3
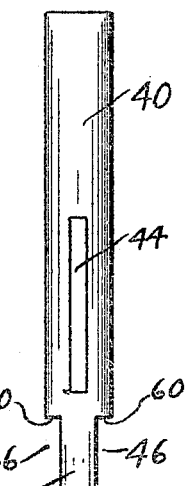
FIG. 3
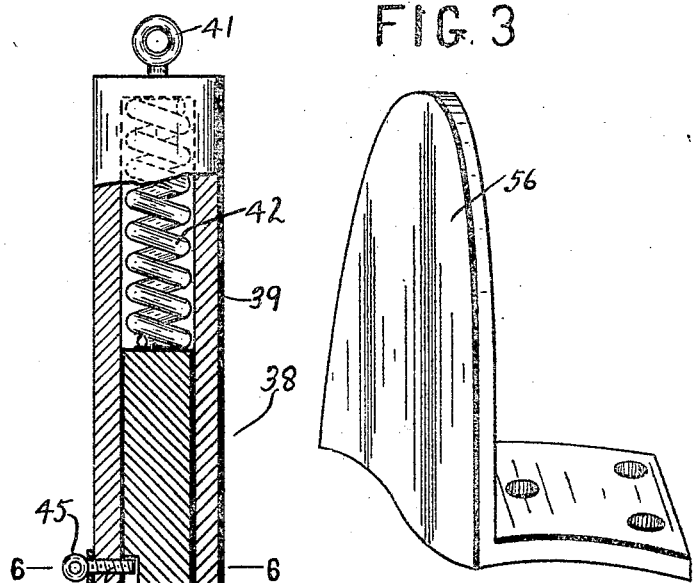
FIG. 5
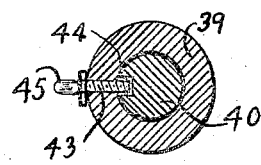
FIG. 6
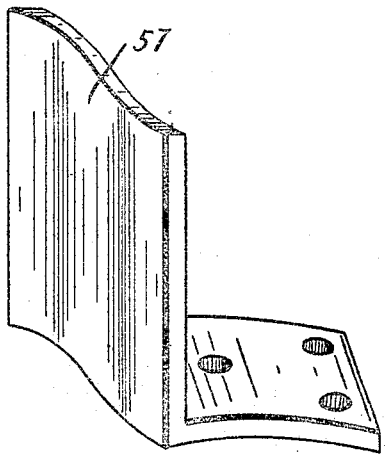
FIG. 4
FIG. 7
Inventor
Wesley T. Brown
by Fetherstonhaugh & Co
Attys.

Patented Apr. 6, 1926.

1,579,277

UNITED STATES PATENT OFFICE.

WESLEY THOMAS BROWN, OF HAMILTON, ONTARIO, CANADA.

LAND-CULTIVATING MACHINE.

Application filed March 3, 1923. Serial No. 622,599.

*To all whom it may concern:*

Be it known that I, WESLEY THOMAS BROWN, a citizen of the United States of America, and a resident of the city of Hamilton, in the county of Wentworth, Province of Ontario, Dominion of Canada, have invented certain new and useful Improvements in Land-Cultivating Machines, of which the following is a specification.

My invention relates to improvements in land cultivating machines and the object of the invention primarily is to provide a device to be used in conjunction with ploughs which will loosen and cultivate the sub-soil at the bottom of the furrow without mixing this sub-soil with the top soil turned by the plough, thus providing for the cultivation of the land to a greater depth than is possible by the ploughs alone. Other objects will appear in the course of the following specification.

My invention consists essentially of a plough and a wheel provided with radially projecting cutivator blades or protuberances disposed about its periphery, said wheel being narrower than the furrow formed by the plough and being situated in alignment behind the plough, so that the wheel follows within the furrow and the cutivator blades dig into the sub-soil at the bottom of the furrow, as the wheel rotates and follows along the furrow, behind the plough, all as hereinafter more particularly described and illustrated in the accompanying drawings in which:—

Figs. 3 and 4 are detached perspective views of forms of cultivator blades, which may be used in my invention.

Fig. 5 is a vertical section of a spring strut used in my invention.

Fig. 6 is a section on the line 6, 6 of Fig. 5.

Fig. 7 is a side elevation of a plunger used in the strut shown in Figure 5, looking in the direction of the arrow.

In the drawings like characters of reference indicate corresponding parts in the different views.

Figure 1:
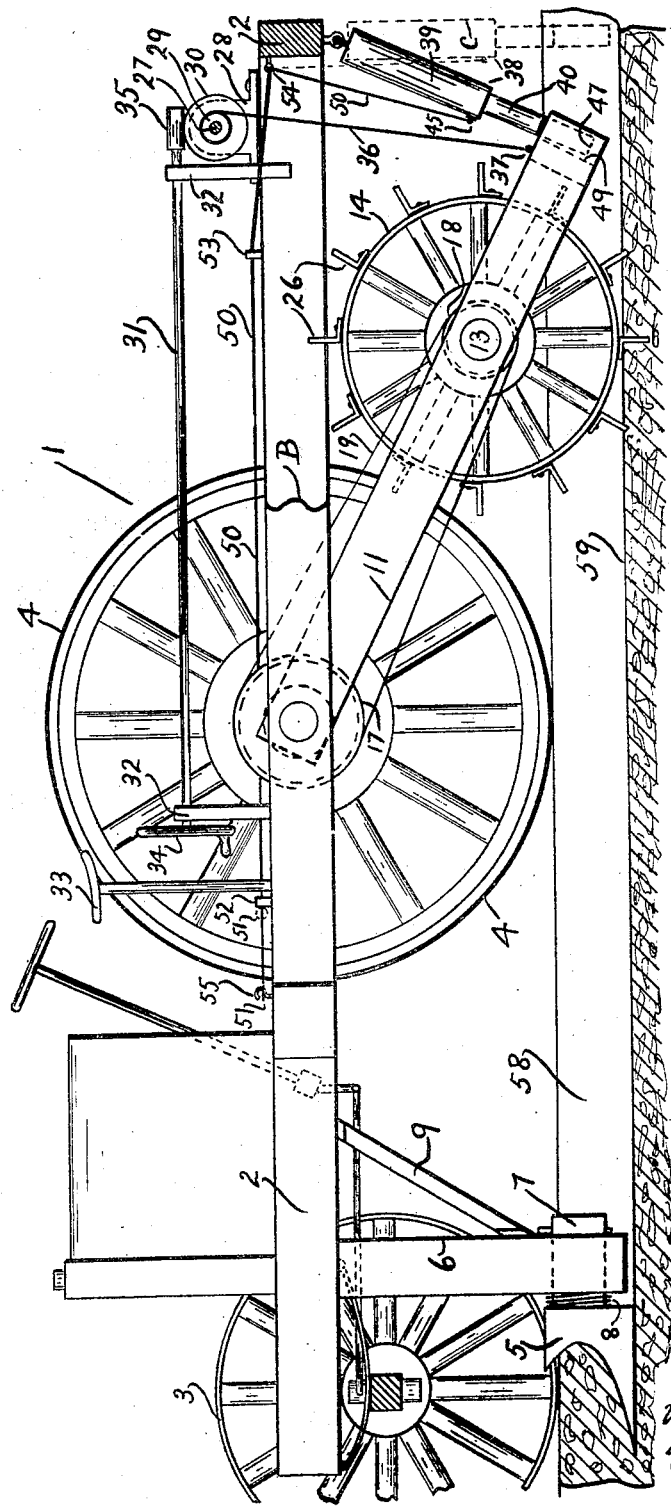
Fig. 1 is a diagrammatic side elevation of a tractor showing the application of my invention thereto, the near tractor wheels and the near side of the tractor frame, from the point "B" rearwardly, being removed.

My invention is applicable to a tractor 1 which may be of any standard type and is shown diagrammatically only, in the accompanying drawings.

The main frame of the tractor is indicated at 2, 3 being the front wheels and 4 the rear wheels.

A plough 5 is supported towards the front end of the tractor in any suitable manner.

In the drawings the support for this tractor is shown diagrammatically and consists of a post 6 depending from the main frame 2, through which post a shank 7 carrying the plough extends, a spring 8 being interposed between the rear side of the plough and the post in order to provide a resilient backing for the plough.

Diagonal braces 9 extend rearwardly from the post 6 to the main frame 2.

The rear axle housing of the tractor is shown at 10.

Figure 2:
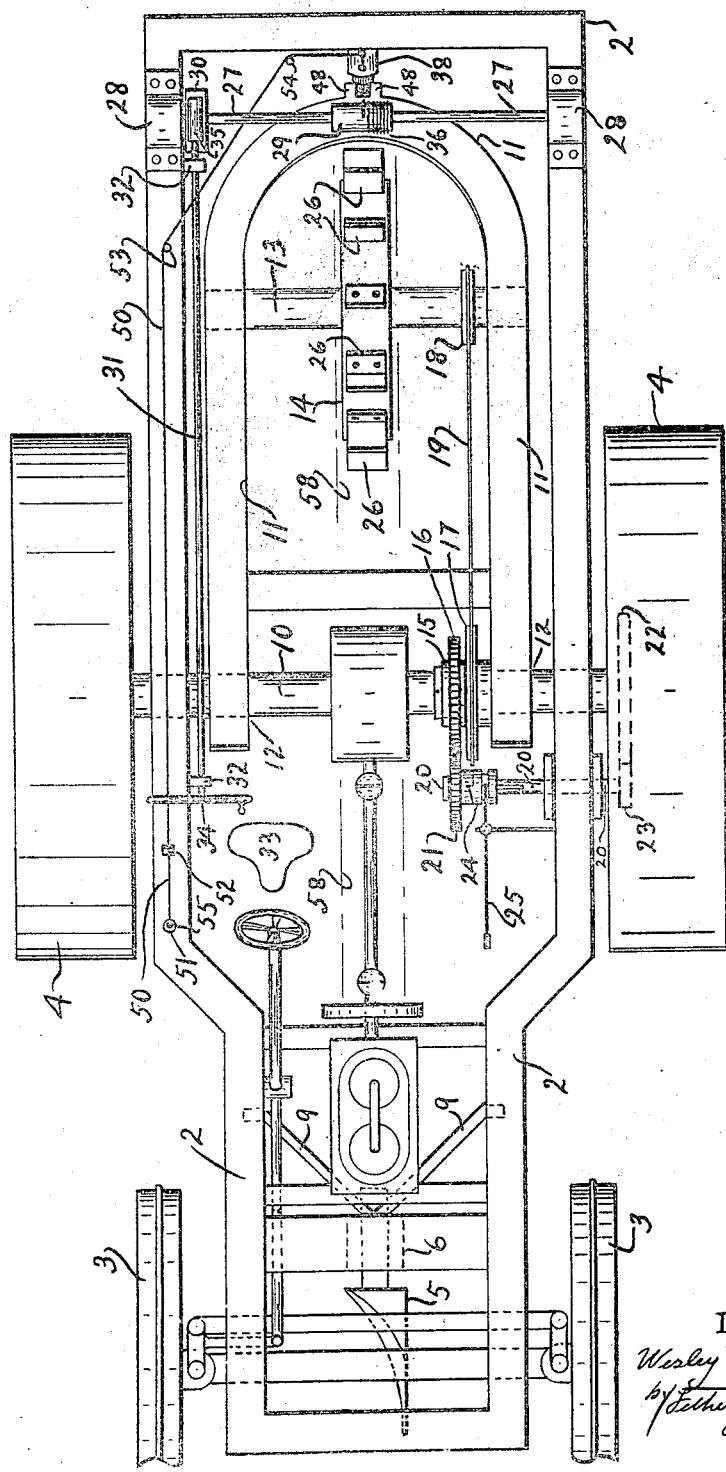
Fig. 2 is a diagrammatic plan view of a tractor showing my invention applied thereto.

Mounted within the main frame 2 is a subsidiary frame 11, the front end of which is journalled upon the rear axle housing 12 (see Fig. 2).

A live axle 13 is journalled in the frame 11 towards the rear end thereof and 14 is a cultivator wheel mounted upon the shaft 13. The width of the cultivator wheel is less than the effective furrow making width of the plough, the purpose of which will presently appear.

A sleeve 15 is rotatably mounted upon the rear axle housing 10, and 16 and 17 are a gear wheel and a sprocket wheel respectively, carried by said sleeve.

A sprocket wheel 18 is rigidly carried by the shaft 13 and 19 is a chain operatively connecting the sprocket wheels 17 and 18.

A shaft 20 is journalled in the main frame 2 and 21 is a gear wheel rotatably mounted upon the inner end of this shaft and meshing with the gear wheel 16.

Intermeshing gear wheels 22 and 23 are carried respectively by one of the rear tractor wheels 4 and the outer end of the shaft 20.

A dog clutch of standard type is indicated collectively at 24 and is slidably mounted upon the shaft 20. This clutch is operated by a lever 25.

Radially projecting cultivator blades 26 are secured to the periphery of the wheel 14 (see Figs. 1 and 2).

A transverse shaft 27 is rotatably supported in bearing blocks 28, which are mounted at the rear of the main tractor frame 2.

A drum 29 is fixedly carried at the center of the shaft 27.

A worm wheel 30 is rigidly carried by the shaft 27 adjacent to one end thereof.

A shaft 31 is journalled in brackets 32 and extends forwardly of the tractor into proximity to the driver's seat 33, and 34 is a hand wheel carried by the forward end of this shaft.

A worm 35 is rigidly carried at the rear end of the shaft 31 and operatively engages the worm wheel 30.

A cable 36 has one end secured to the rear end of the subsidiary frame 11 at 37 and the other end secured to the drum 29.

A spring strut which is constructed much after the manner of an ordinary shock absorber is indicated collectively at 38.

This strut comprises the telescoping members 39 and 40, the member 39 being in the form of a cylinder open at one end, and the member 40 being a plunger engaging the open end of the cylinder 39.

The upper end of the cylinder 39 is connected to the rear end of the main frame 2 by means of the eye 41.

A coil spring 42 is mounted within the cylinder 39 and engages the upper end of the plunger 40.

A screw 43 is carried adjacent to the lower end of the cylinder 39 and its inner end projects into a longitudinal slot 44 formed in the plunger 40.

The outer end of the screw 43 is formed into an eye 45.

The plunger 40 is cylindrical throughout its length with the exception of its lower end, the sides of which are recessed at 46 to form a terminal tongue 47 on the plunger. Undercut shoulders 60 are formed at the junction of the tongue with the main portion of the plunger.

Tongues 48 project rearwardly from the rear end of the subsidiary frame 11 and form between them a recess 49 into which the terminal tongue 47 of the plunger is adapted to enter.

A cable 50 has one end secured to the eye 45 and the other end carries a loop or ring 51. This cable 50 passes freely through guides 52, 53 and 54.

A hook 55 is carried by the main frame 2 and is adapted to engage the ring 51 for a purpose as will presently appear.

Modified forms in which the cultivator blades may be made are shown at 56 and 57 (see Figs. 3 and 4).

The furrow formed by the plough is indicated at 58 and 59 indicates the sub-soil at the bottom of this furrow.

The construction and operation of my invention is as follows.

The plough 5 is mounted towards the front end of the tractor and the cultivating wheel 14 is situated adjacent to the rear end of the tractor and in alignment behind the plough.

In employing my invention the subsidiary frame 11 is lowered so that the periphery of the wheel 14 rides upon the bottom of the furrow 58 and it will be evident that as the tractor advances the cultivator blades 26 will dig into the sub-soil 59 and loosen same.

In order to insure a proper cultivating action by the wheel 14 it is so geared that its peripheral speed is slightly greater than the advancing speed of the tractor.

The action of the strut 38 will be clear from the drawings and is as follows.

When the subsidiary frame 11 is fully lowered the strut 38 is pulled forwardly by means of the cable 50 and the terminal tongue 47 engages within the recess 49 in the frame 11. The strut is held in this position by engaging the ring 51 on the hook 55 (see Fig. 1).

In this position of the strut the rear end of the frame 11 engages the undercut shoulders 60 so that the frame 11 can only rise against the compression of the spring 42. This insures that the cultivating wheel 14 will be held downwardly to enable the cultivator blades 26 to ordinarily penetrate the sub-soil but, due to the resiliency of the spring 42, in the event of the wheel 14 striking a rock or such like the frame 11 and wheel 14 would be permitted to rise against the compression of the spring 42.

The manner of driving the wheel 14 will be clear from inspection of Figs. 1 and 2 and is as follows.

The shaft 20 is driven from the main drive through the gear wheels 22 and 23 and when the clutch 24 is engaged, as is the case in Figure 2, the gear wheel 21 will be rotated. This in turn rotates the gear wheel 16 and sprocket wheel 17. From the wheel 17 the sprocket wheel 18 is driven by means of the chain 19 and this sprocket wheel in turn rotates the shaft 13 and cultivator wheel 14.

The drive to the wheel 14 is disconnected by disengaging the clutch 24 by means of the lever 25.

The manner of lifting the subsidiary frame 11 and wheel 14 will now be explained.

The ring 51 is disengaged from the hook 55 and the strut 39 disengages by gravity from engagement with the frame 11, the strut falling into the position shown in broken lines at "C" in Figure 1, in which position the ring 51 engages the forward end of the guide 52.

The frame 11 is then raised by rotating the hand wheel 34 which, through the medium of the worm 35, worm wheel 30 and shaft 27 rotates the drum 29 and winds the cable 36 thereon so that the frame 11 is raised.

In order to maintain at all times the proper distance between the centers of the sprocket wheels 17 and 18 the sprocket wheel 17 is disposed concentrically with the center of swing of the frame 11.

The slot 44 in the plunger 40 is positioned so that, when it is at the outer end of its stroke with the screw 43 engaging its upper end, the plunger is in the proper position for engaging within the recess 49 of the frame 11, when the frame is in its lowermost position.

In Figs. 3 and 4 cultivator blades are shown which are inclined diagonally across the cultivator wheel and these blades are also curved and pitched after the manner of a propeller blade.

Various modifications may be made in my invention without departing from the spirit of the invention or the scope of the claims and therefore the exact form shown is to be taken as illustrative only and not in a limiting sense.

For instance my invention may be applied to practically any standard form of tractor and therefore a diagrammatic form of illustration for the tractor itself has been used and obviously the various tractor details as illustrated are immaterial.

Also various other methods of mounting the subsidiary frame 11 might be used than that illustrated.

Further other arrangements for driving the wheel 14 than the chain and sprocket drive shown might obviously be employed.

From the foregoing it will be seen that I have devised an apparatus for use in conjunction with ploughs whereby the sub-soil at the bottom of the furrow may be effectively cultivated thus enabling a deeper cultivation than is obtained by the use of ploughs alone.

What I claim as my invention is:

In a machine of the class described, the combination with the main frame of the machine, of a subsidiary frame associated with the main frame and extending rearwardly from a point intermediately of the length of the main frame, said subsidiary frame journalled at its forward end within the main frame about a transverse, horizontal axis, a wheel mounted within the subsidiary frame at the rear end thereof and rotatable about a transverse, horizontal axis, cultivator protuberances disposed about the rim of the wheel, and extending radially outward therefrom, means for rotating the wheel, means for swinging the subsidiary frame up and down as desired, and a resilient strut engageable between the main frame and rear end of the subsidiary frame when the subsidiary frame is in its lowermost position, said strut comprising a cylindrical shell swingably hung from the rear end of the main frame, said shell closed at its upper end and open at its lower end, a piston telescoping within the lower open end of the shell, a compression coil spring within the shell and coacting between the shell and piston, means on the main frame for swinging the strut forwardly, and a terminal tongue at the lower end of the piston adapted to engage within a recess at the rear end of the subsidiary frame.

WESLEY THOMAS BROWN.